July 14, 1942.  K. RAPP  2,289,454

FEATHER BROODER

Filed Aug. 7, 1939

Kenneth Rapp INVENTOR.

BY Gilbert E. Moody
ATTORNEY.

Patented July 14, 1942

2,289,454

UNITED STATES PATENT OFFICE 2,289,454

FEATHER BROODER

Kenneth Rapp, Merced County, Calif.

Application August 7, 1939, Serial No. 288,839

2 Claims. (Cl. 119—33)

This invention relates to improvements in feather brooders used in the protection and rearing of poultry.

An important object of the invention is to mechanically duplicate natural brooding under hens, and to provide an inexpensive and efficient device of this character.

Other objects of the invention are to prevent the crowding of poultry within the brooder, to allow the brooding of a greater number of poultry in relation to heated air space than is possible in the use of closed center brooders, to provide two heated air spaces of different temperatures, to provide an unlimited supply of fresh unheated air for the breathing of brooding poultry, to permit poultry easy access to feed and water, to provide sheltered fresh air spaces, and to provide a simple and economical method of fastening and using feathers in a brooder.

Other objects and advantages of the invention will be apparent during the course of the following description.

In the accompanying drawing, in which like numerals are employed to designate like parts:

Figure 1:
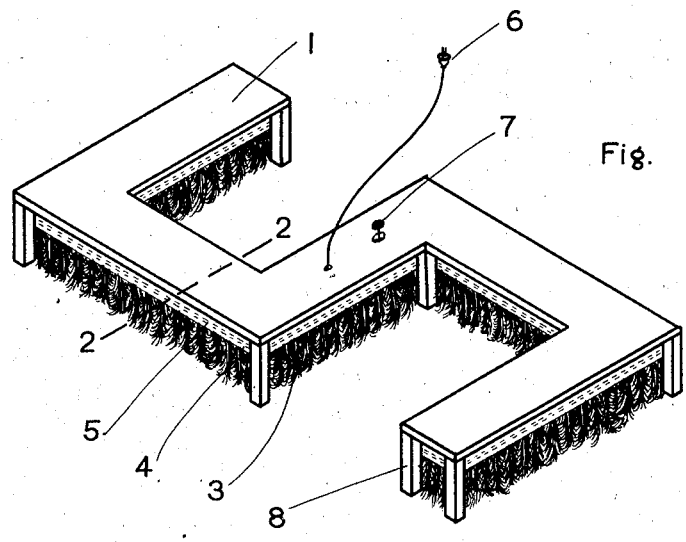
Figure 1 is a perspective view of the invention.
Figure 2:
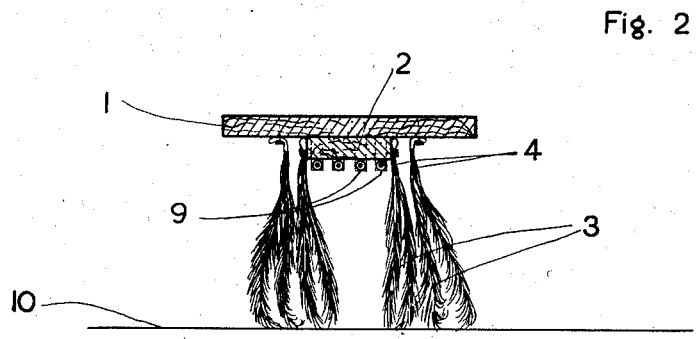
Figure 2 is a vertical section taken on line 2—2 of Figure 1.

In the drawing, wherein for the purpose of illustration is shown a preferred embodiment of the invention, numeral 1 designates the top of the brooder, which extends over lower members of the brooder and may be made of wood or any other suitable material, to which a member 2 is permanently affixed, serving to support an inner and outer wall of feathers 3 and heating elements 9. The member 2 is preferably of wood in order to secure insulation value and ease of construction.

The inner wall of feathers is tightly affixed to the member 2 so that the feathers form a stiff yet penetrable wall against which poultry may snuggle. The outer wall of feathers is hung loosely from the top member 1 providing easy access and a loose covering for the poultry.

The feathers are preferably downy turkey feathers and are supported by folded cloth strips 4 into which the quill ends of the feathers are placed without stripping and are fastened by stitching through the cloth.

Insulated electrical heating elements 9 are stapled or otherwise affixed to the member 2 in as many parallel rows as the size of the heated space may require. An electric service cord 6 is connected to the heating elements, and the control 7 of a thermostat regulating the heat within the brooder may extend through the top of the brooder or be placed at any other convenient point. One of a plurality of members supporting the brooder is designated by numeral 8, but it is to be understood that any suitable means of support may be used.

In use and operation, the brooder is set upon the ground or floor 10, supported at such a height that the lower ends of the feathers contact the ground or floor, an electric current is directed to the heating elements, and poultry are introduced to the brooder and have access to the heated brooding space through the feathers. The two walls of feathers insulate the heated space and also provide areas of different temperature within the brooder, that is, the area directly under the heating elements and the areas between the feathers. Because the heated space is relatively narrow, it is impossible for crowding to occur. The S shape of the brooder provides the poultry with free access to feed, water, and sheltered fresh air and also the shape tends to prevent crowding by breaking up poultry into small groups. Unlimited fresh air for breathing is obtained by the poultry by putting their heads through the feathers into the outside air, while their bodies remain within the heated air spaces. The extension of the top 1 of the brooder over the dependent feathers prevents spoiling of the feathers by droppings from poultry roosting on the top of the brooder.

It is to be understood that the form of the invention, herewith shown and described, is to be taken as a preferred embodiment of the same, and that various changes in the shape, size, and arrangement of parts may be resorted to, without departing from the spirit of the invention or the scope of the subjoined claims.

What I claim is:

1. A poultry brooder comprising a top member, members supporting the brooder and affixed to the top member, a lower member of smaller width than the top member, electrical heating elements affixed to the said lower member, and two walls of feathers affixed parallel to each other, the inner wall dependent from said lower member and the outer wall dependent from the top member, forming narrow heated brooding spaces.

2. A poultry feather brooder comprising a top member, supporting members affixed to the top members, a narrow lower member of less width than the top member affixed to the top member, electric heating elements affixed to the lower member, a wall of feathers supported in a cloth strip affixed to the outer edges of the lower member, the feathers, heating elements, and lower member forming a central narrow heated brooding space, and a wall of feathers supported in a cloth strip and loosely dependent from the top member exterior to the other row wall of feathers and forming a small protected brooding area adjacent to the central brooding space, the brooder being longitudinally disposed at angles to form protected areas for feeding and exercise, substantially as described.

KENNETH RAPP.